United States Patent [19]

Hirsch

[11] Patent Number: 4,725,693

[45] Date of Patent: Feb. 16, 1988

[54] POWER CABLE AND LAMINATE PROVIDING MOISTURE BARRIER FOR POWER CABLE

[75] Inventor: Arthur Hirsch, Elizabeth, N.J.

[73] Assignee: Arvey Corporation, Chicago, Ill.

[21] Appl. No.: 904,709

[22] Filed: Sep. 8, 1986

[51] Int. Cl.$^4$ .............................................. H01B 7/18
[52] U.S. Cl. .............................. 174/107; 174/106 SC; 428/381; 428/461
[58] Field of Search ................... 174/102 SC, 105 SC, 174/106 SC, 107, 133 R; 428/381, 198, 425.8, 461

[56] References Cited

U.S. PATENT DOCUMENTS

| | | | |
|---|---|---|---|
| 4,322,574 | 3/1982 | Bow et al. .......................... 174/107 |
| 4,454,379 | 6/1984 | Cleveland et al. .................. 174/107 |
| 4,472,597 | 9/1984 | Vematsu ......................... 174/107 X |
| 4,511,626 | 4/1985 | Schumacher ..................... 428/425.8 |
| 4,626,475 | 12/1986 | Goel et al. ..................... 428/425.8 X |
| 4,626,619 | 12/1986 | Vematsu ........................ 174/106 SC |

Primary Examiner—Morris H. Nimmo
Attorney, Agent, or Firm—Dressler, Goldsmith Shore Sutker & Milnamow

[57] ABSTRACT

An electrically-conductive sheet-form laminate is disclosed and a power cable made thereof. The laminate has a resistivity of no more than about $10^6$ ohm-centimeters across the thickness dimension thereof. The sheet-form laminate comprises an electrically-conductive non-metallic layer, an electrically-conductive metal foil layer in juxtaposition thereto, and a discontinuous but electrically non-conductive bonding layer therebetween. The electrically-conductive non-metallic layer is constituted by a particulate conductive material-filled polymeric resin; and the electrically non-conductive bonding layer comprises a cured polymeric substance, preferably a polyurethane-based adhesive.

8 Claims, 2 Drawing Figures

POWER CABLE AND LAMINATE PROVIDING MOISTURE BARRIER FOR POWER CABLE

TECHNICAL FIELD OF THE INVENTION

The present invention is directed to an electrically-conductive sheet-form laminate that is preferably utilized to provide a moisture barrier for power cable.

BACKGROUND OF THE INVENTION

Commercial power cable comprises a number of differing layers of materials, each layer generally serving a different function. One example of such power cable commonly comprises a central conductive core, an insulation layer surrounding the core, a shield layer surrounding the insulation layer, and an exterior jacket surrounding the shield layer. Because the useful life of the power cable, in particular the insulation layer thereof, is generally reduced by the presence of moisture, it is common to locate a water-impervious layer between the shield layer and the exterior jacket, as is shown in U.S. Pat. No. 4,472,597 to Uematsu.

Notwithstanding the teachings of the Uematsu patent, it has been observed that pin holes and cracks develop in the water-impervious layer of the type of power cable disclosed in Uematsu when such power cable is utilized in a commercial environment, particularly when aluminum or copper are utilized as the water-impervious layer. The formation of pin holes and cracks in the water-impervious layer is of course undesirable, and occasionally results in such significant damage to the power cable as to necessitate replacement thereof.

It would be desirable to provide certain manufactured goods such as power cable with a water impervious layer or boundary, that is able to provide the manufactured goods with a relatively long useful life when utilized in a commercial environment.

Surprising, it has been discovered that, when a relatively thin layer of certain electrically non-conductive adhesives are utilized to bond an electrically-conductive non-metallic layer of a particular material to a layer of selected kinds or types of electrically-conductive metal foil, a laminate able to provide the manufactured goods with a relatively long useful life and possessing substantial electrical conductivity across the thickness dimension thereof is produced as a result.

SUMMARY OF THE INVENTION

The present invention is an electrically-conductive sheet-form laminate having a resistivity of no more than about $10^6$ ohm-centimeters across the thickness dimension thereof. That is, the present laminate is electrically conductive across the thickness dimension thereof, as will be discussed in greater detail below.

The present sheet-form laminate comprises an electrically-conductive non-metallic layer, a metal foil layer in juxtaposition thereto, and a discontinuous but electrically non-conductive bonding layer therebetween. The electrically-conductive non-metallic layer is constituted by a particulate conductive material-filled polymeric resin. The discontinuous but electrically non-conductive bonding layer comprises a cured polymeric substance.

DETAILED DESCRIPTION OF PREFERRED EMBODIMENTS

Figure 1:
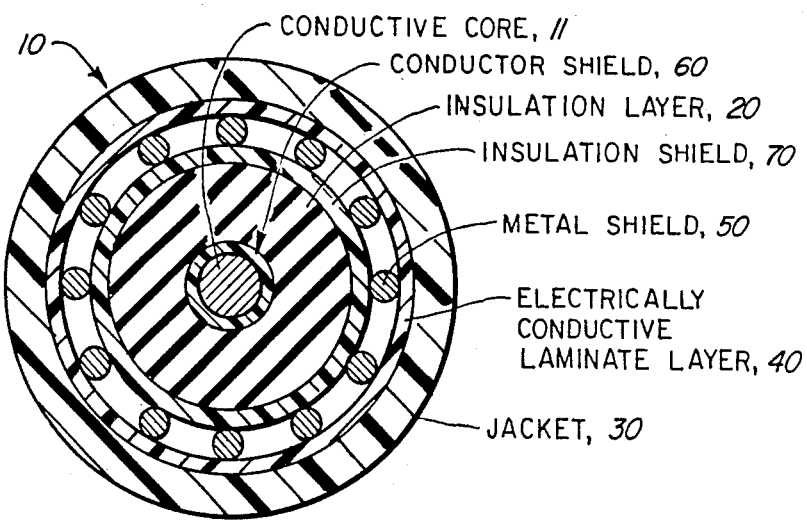
FIG. 1 is a sectional view showing an illustrative example of conventional power cable incorporating the electrically-conductive sheet-form laminate of the present invention.

While the present invention is susceptible to embodiment in various forms, there is shown in the accompanying FIGURES, presented by way of the accompanying EXAMPLES, and otherwise described herein in detail, several preferred embodiments of the invention. However, the present disclosure is to be considered as an exemplification of the invention without limitation to the specific embodiments illustrated, presented by way of example, or otherwise herein discussed.

The present laminate can be manufactured as a sheet which can be cut into ribbons or tapes of desired width.

The electrically-conductive sheet-form laminate of the present invention can be used in a conventional power cable, for which the present laminate provides a substantial moisture barrier. An illustrative power cable 10 (FIG. 1) comprises an electrically-conductive core 11, an insulation layer 20 surrounding the core 11, and an outer or exterior jacket 30 surrounding the insulation layer 20. Core 11, located at the center of power cable 10, carries substantially all of the electrical current and thus is the principal electrical conductor portion of cable 10.

Spaced between the insulation layer 20 and the outer jacket 30, and providing a moisture barrier therebetween, is the electrically-conductive sheet-form laminate layer 40 (FIG. 1) of the present invention. The present laminate layer 40 (FIG. 2) comprises an electrically-conductive non-metallic layer 40a, a metal foil layer 40b in juxtaposition to the non-metallic layer 40a, and a discontinuous but electrically non-conductive bonding layer 40c therebetween. The electrically-conductive non-metallic layer 40a is constituted by a particulate conductive material-filled polymeric resin. A preferred particulate conductive material is carbon black; however, other particulate conductive materials such as metal powders can be used as well. Suitable polymeric resins are discussed below. The discontinuous but electrically non-conductive bonding layer comprises a cured polymeric substance.

Figure 2:
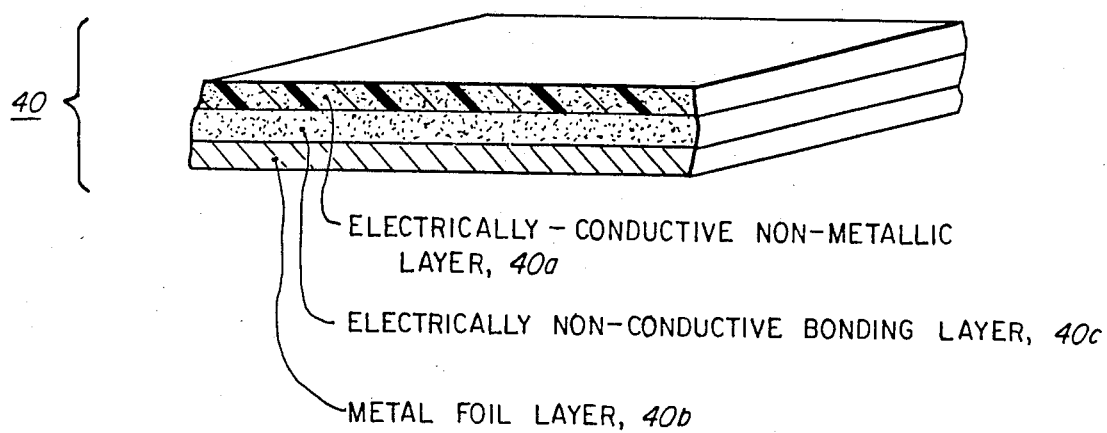
FIG. 2. is a cross-sectional view of the present laminate on an enlarged scale relative to FIG. 1.

Conventional power cable 10 additionally may include a metal shield layer 50 (FIG. 1). Such metal shield layer 50 can be located between the insulation layer 20 and the electrically-conductive laminate layer 40 of the present invention. The power cable 10 may also include a conductor shield layer 60 which can be located between the conductive core 11 and the insulation layer 20. Power cable 10 may further include an insulation shield layer 70 which can be located between the insulation layer 20 and the metal shield layer 50.

The metal foil layer 40b of the present laminate is preferably of a metal such as aluminum, copper and lead. More preferably, the metal of the foil layer is lead. The metal foil layer 40b of the present laminate preferably has a thickness of about 0.5 to about 5 mils, and more preferably, of about 1.2 to about 2 mils.

The present sheet-form laminate has a resistivity of no more than about $10^6$ ohm-centimeters. This means that where the cross-sectional area of the present laminate is one square centimeter, such cross-sectional area of the present laminate has an electrical resistance of no more than about $10^6$ ohms per centimeter of sheet-form laminate thickness.

The term "volume resistivity," as set forth in ASTM D257, is herein utilized to indicate the amount of electrical current that leaks through the bulk of power cable such as illustrated power cable 10, i.e. the current leakage flowing generally radially from conductive core 11 to jacket 30. Volume resistivity of a material is commonly determined by sandwiching a substantially flat test specimen of the material to be tested, usually in the form of a disk, between two electrodes. One electrode is shielded to prevent electrical leakage from around the edge portions thereof. A given voltage is then applied between the electrodes, and the resulting electrical current through the bulk of the specimen measured utilizing a suitable instrument. The detailed procedure is described in American Society for Testing and Materials Procedure No. ASTM D257, which description is incorporated herein by reference.

The volume resistivity value of a material is commonly utilized as an indication as to whether the material has physical properties that are generally deemed as being electrically insulative, electrically conductive, or somewhere in-between. In particular, a volume resistivity value of more than about $10^6$ ohm-centimeters is generally deemed to indicate that the material can be utilized as an insulator. A value of about 10 to about $10^6$ ohm-centimeters is generally deemed to indicate that the material is conductive. This does not necessarily mean, however, that the material can be utilized as an electrical conductor ipso facto. A value of about $10^{-3}$ to about 10 ohm-centimeters is generally deemed to indicate that the material can be utilized as a semiconductor, and a value of less than about $10^{-3}$ ohm-centimeters is generally deemed to indicate that the material can be utilized as an electrical conductor ipso facto. All such volume resistivity values are conventionally determined when the material is at room temperature (i.e. about 25° C.). Thus, a volume resistivity value of less than about $10^6$ ohm-centimeters is conventionally deemed to indicate that the material being utilized is electrically conductive. See, e.g., Modern Plastics Encyclopedia 1985–1986, published by McGraw-Hill, Inc., 1985, at page 433.

Illustrative polymeric resins that are suitable for purposes of the present laminate can be ABS (acrylonitrile-butadiene-styrene copolymer), polyamide, polyamide-imide, polycarbonate, polyester (thermoplastic variety), polyether-etherketone, polyetherimide, polyethylene, polyphenylene oxide (modified variety), polyphenylene sulfide, polypropylene, polystyrene, PVC (polyvinyl chloride), sulfone polymers, and the like. Other polymeric resins suitable for use in conjunction with the aforementioned particulate conductive materials are acrylonitrile-butadiene rubber, chlorinated polyethylene, chloroprene rubber, chlorosulfonated polyethylene, ethylene-acrylic acid copolymer, ethylene-ethylacrylate copolymer, ethylene-propylene copolymer, ethylene-vinyl acetate modified polyethylene (EVA/PE), ethylene-vinyl acetate vinyl chloride graft copolymer, isoprene rubber, polybutene-1, polymethylpentene, styrene-butadiene rubber, and the like. Preferably, the polymeric resin of the present laminate is polyethylene. The polyethylene can be of the low density variety (LDPE) or of the high density variety (HDPE).

The polymeric resin can be a foam. Specifically, when the polymeric resin of the non-metallic layer is a layer of foam, such foam layer can be about $\frac{1}{8}$ to about $\frac{3}{4}$ inches thick, can be polyurethane-based, may be compressible along the thickness dimension thereof, and may be heat-sealable to LDPE to allow an overlap type of weld-seal to be made.

Illustrative particulate conductive materials that are suitable for the electrically-conductive non-metallic layer 40a of the present laminate are aluminum flake, particulate carbon, carbon black, carbon fiber, graphite fiber, metallized glass beads, metallized glass fiber, nickel-coated carbon fiber, nickel-coated graphite fiber, nickel-plated carbon fiber, stainless steel, and the like. Preferably, the particulate conductive material present in the particulate conductive material-filled polymeric resin of the present laminate is electrically-conductive particulate carbon, carbon black, or metal powder.

The non-conductive bonding layer, which is typically applied in relatively minimal amounts,—e.g., about 0.001 grams per square centimeter, or less—is not itself electrically conductive, yet does not interfere with the electrically-conductive characteristic or property which the present laminate possesses across the thickness dimension of the laminate. It is believed that this is because such minimal amount of the bonding agent provides an electrically non-conductive bonding layer 40c which is discontinuous. The discontinuous nature of bonding layer 40c, in turn, allows the electrically-conductive non-metallic layer 40a to be in conductive contact with the metal foil layer 40b so that the present laminate is electrically conductive through the layers, i.e. across the thickness dimension, thereof.

Furthermore, bonding layer 40c together with non-metallic layer 40a and metal foil 40b provide certain manufactured goods such as power cable 10 with a durable, substantially water impervious layer or boundary.

Illustrative of the non-conductive bonding agents which provide a curable bonding layer suitable for purposes of the present invention are acrylic resins, acrylonitrile resins, alkyd resins, allyl resins, cellulosic compositions, epoxy resins, melamine resins, phenolic resins, polycarbonate resins, polyetherimide resins, polyethylene/ethylenevinyl acetate resins, polyimide resins, polyphenylene oxide/ether resins, polyurethane resins and the like. Preferably, the polymeric substance of the discontinuous but electrically non-conductive bonding layer is a polyurethane-based adhesive.

The following examples are further illustrative of the types of water-impervious laminates that can be made in accordance with the principles of the present invention.

EXAMPLE 1

Laminate Comprising EVA/PE, Polyurethane-Based Adhesive and Lead Foil

A laminate, having a volume resistivity of about $10^4$ ohm-centimeters across the thickness dimension thereof, was made and comprised a 2-mil-thick layer of lead foil, a pair of 4-mil-thick layers of electrically-conductive ethylene-vinyl acetate modified polyethylene (EVA/PE), and an electrically non-conductive polyurethane-based adhesive applied to each one of the opposite surfaces of the lead foil layer in an amount sufficient to form a discontinuous layer but sufficient to adhesively bond the EVA/PE layer to each one of the opposite surfaces of the lead foil layer.

Specifically, the adhesive was applied in an amount of about 0.0009 grams per square centimeter. The adhesive utilized was a commercially available two-component curing-type laminating adhesive comprising about 40%, by weight, of an active adhesive-bonding ingredient and about 60%, by weight, of methyl ethyl ketone as its relatively volatile solvent or carrier. This polyurethane-based adhesive is commercially available from Morton Thiokol, Inc., Morton Chemical Division, Chicago, Ill. 60606, under the designation ADCOTE 506-40. Such a polyurethane-based adhesive is cured utilizing an isocyanate-terminated, catalytically-active prepolymer composition comprising about 75%, by weight, of a catalytically-active agent and about 25%, by weight, of ethyl acetate as its volatile solvent, carrier or diluent. The composition used is commercially available from Morton Thiokol under the designation CATALYST 9L10.

EXAMPLE 2

Laminate Comprising LDPE

A laminate was made utilizing the adhesive discussed in EXAMPLE 1. The laminate comprised a 2-mil-thick lead foil layer, a 4-mil thick EVA/PE layer adhesively bonded to one surface thereof, and an electrically-conductive 2-mil-thick layer of low density polyethylene (LDPE) adhesively bonded to the opposite surface thereof. The laminate was observed to have a volume resistivity of about $10^{12}$ ohm-centimeters across the thickness dimension thereof.

EXAMPLE 3

Laminate Comprising Conductive PE

A laminate was made utilizing the adhesive discussed in EXAMPLE 1. The laminate comprised a 2-mil thick lead foil layer, and a 4-mil thick particulate carbon-filled electrically-conductive polyethylene (PE) layer adhesively bonded to one surface of the lead foil layer. The laminate was observed to have a volume resistivity of about $10^3$ to about $10^4$ ohm-centimeters across the thickness dimension thereof.

EXAMPLE 4

Laminate Comprising EVA/LDPE

A laminate was made substantially as described above in EXAMPLE 2 except that a 2-mil-thick layer of electrically-conductive ethylene-vinyl acetate modified low-density polyethylene (EVA/LDPE) was substituted for the electrically-conductive, 2-mil-thick LDPE layer. The laminate was observed to have a volume resistivity of about $10^{12}$ ohm-centimeters across the thickness dimension thereof.

EXAMPLE 5

Laminate Comprising EVA/LDPE, Polyurethane-Based Adhesive and Lead Foil

A laminate was made of a 2-mil-thick layer of lead foil, a pair of 4-mil-thick layers of electrically-conductive EVA/LDPE, and an electrically non-conductive polyurethane-based adhesive applied to each one of the opposite surfaces of the lead foil layer to adhesively bond a EVA/LDPE layer to each one of the opposite surfaces of the lead foil layer while maintaining conductivity across the thickness dimension of the laminate.

Specifically, the adhesive was applied in an amount of about 0.0009 grams per square centimeter. The adhesive utilized was a commercially-available two-component composition comprising about 55%, by weight, of an active adhesive-bonding ingredient and about 45%, by weight, of methyl ethyl ketone as its relatively volatile solvent or carrier, namely the curable adhesive commercially available from Morton Thiokol, Inc., under the designation ADCOTE 549. This adhesive was cured utilizing an isocyanate-terminated prepolymer composition comprising about 75%, by weight, of catalytically-active agent and about 25%, by weight, of a mixture containing ethyl acetate and free toluene diisocyanate monomer as its relatively volatile solvent, carrier or diluent. The prepolymer composition was ADCOTE CATALYST F, commercially available from Morton Thiokol, Inc.

The laminate was observed to have a volume resistivity of about $10^3$ ohm-centimeters across the thickness dimension thereof.

EXAMPLE 6

Laminate Comprising PVC, Polyurethane-Based Adhesive and Lead Foil

A laminate was made from a 2-mil-thick layer of lead foil, a pair of 4-mil-thick layers of electrically-conductive polyvinyl chloride (PVC), and an electrically non-conductive polyurethane-based adhesive. The adhesive was applied to each one of the opposite surfaces of the lead foil layer to adhesively bond a PVC layer to each one of the opposite surfaces of the lead foil layer while maintaining conductivity in the thickness dimension.

Specifically, the adhesive was applied in an amount of about 0.008 grams per square centimeter. The adhesive utilized was a linear polyester polyurethane adhesive derived from a polyester-based polyol and a polymeric diisocyanate in a relatively volatile solvent such as methyl ethyl ketone (MEK). To produce the adhesive, the polyol (duPont 46982 Polyester, about 198 pounds in about 169 pounds of MEK) and the polymeric diisocyanate (MONDUR CB 75, about 12 pounds in about 10 pounds of MEK) were combined and mixed thoroughly. The resulting admixture was adjusted with MEK to a solids content of about 25 percent and a viscosity of about 160 to about 170 centipoises.

The laminate was observed to have a volume resistivity of about $10^4$ ohm-centimeters across the thickness dimension thereof.

EXAMPLE 7

Laminate Comprising Foam Layer

A laminate was made substantially as described above in EXAMPLE 1, except that an electrically conductive foam layer having a thickness of about 3 mm was substituted for one of the EVA/PE layers. This laminate had a volume resistivity of about $10^4$ ohm-centimeters across the thickness dimension thereof.

What has been illustrated and described herein is a novel, electrically-conductive sheet-form laminate. While the present laminate has been illustrated and described with reference to preferred embodiments, the present invention is not limited thereto. On the contrary, alternatives, changes or modifications will become apparent to those skilled in the art upon reading the foregoing description. Accordingly, such alternatives, changes and modifications are to be considered as forming a part of the invention insofar as they fall within the spirit and scope of the appended claims.

I claim:

1. An electrically-conductive sheet-form laminate having a resistivity of no more than about $10^6$ ohm-centimeters across the thickness dimension thereof and comprising:

an electrically-conductive non-metallic layer;

a metal foil layer in juxtaposition thereto; and a discontinuous but non-conductive bonding layer therebetween;

said non-metallic layer being constituted by a particulate conductive material-filled polymeric resin; and said bonding layer comprising a cured polymeric substance.

2. The electrically-conductive laminate of claim 1 wherein the polymeric resin is polyethylene, and wherein the particulate conductive material is carbon.

3. The electrically-conductive laminate of claim 1 wherein the cured polymeric substance is a polyurethane-based adhesive.

4. The electrically-conductive laminate of claim 1 wherein the metal in the foil layer is selected from the group consisting of aluminum, copper and lead.

5. In a power cable which includes an electrically-conductive core, insulation surrounding the core, and a jacket surrounding the insulation, the improvement which comprises:

an electrically-conductive sheet-form laminate having a resistivity of no more than about $10^6$ ohm-centimeters across the thickness dimension thereof, the laminate being positioned between the insulation and the jacket and providing a moisture barrier therebetween, the electrically-conductive laminate layer comprising:

an electrically-conductive non-metallic layer;

a metal foil layer in juxtaposition thereto, and a discontinuous but non-conductive bonding layer between said non-metallic layer and said metal foil layer;

said non-metallic layer being constituted by a particulate conductive material-filled polymeric resin; and said bonding layer comprising a cured polymeric substance.

6. The power cable of claim 5 wherein the polymeric resin is polyethylene, and wherein the particulate conductive material is carbon.

7. The power cable of claim 5 wherein the cured polymeric substance is a polyurethane-based adhesive.

8. The power cable of claim 5 wherein the metal in said foil layer is selected from the group consisting of aluminum, copper and lead.

* * * * *